US008769159B2

(12) United States Patent
Tongen et al.

(10) Patent No.: US 8,769,159 B2
(45) Date of Patent: Jul. 1, 2014

(54) RESOURCE RESERVATION FOR AN EXTERNAL DEVICE THAT IS NOT AVAILABLE AT STARTUP OF A HOST COMPUTER

(75) Inventors: Jason D. Tongen, Austin, TX (US); Jonathan W. Hearn, Austin, TX (US); Daniel P. Marcotte, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 265 days.

(21) Appl. No.: 13/325,288

(22) Filed: Dec. 14, 2011

(65) Prior Publication Data
US 2013/0159582 A1    Jun. 20, 2013

(51) Int. Cl.
*G06F 13/10*    (2006.01)
*G06F 3/00*    (2006.01)

(52) U.S. Cl.
USPC ............... 710/10; 710/17; 710/104; 710/300; 710/302

(58) Field of Classification Search
USPC ........................................................ 710/300
See application file for complete search history.

(56) References Cited

U.S. PATENT DOCUMENTS

| | | | |
|---|---|---|---|
| 5,632,021 A | 5/1997 | Jennings et al. | |
| 6,055,596 A | 4/2000 | Cepulis | |
| 6,189,050 B1* | 2/2001 | Sakarda | 710/18 |
| 6,205,503 B1* | 3/2001 | Mahalingam | 710/302 |
| 6,898,686 B1* | 5/2005 | Perez | 711/170 |
| 6,931,456 B2 | 8/2005 | Payne et al. | |
| 7,024,501 B1 | 4/2006 | Wright | |
| 7,076,591 B2 | 7/2006 | Arramreddy | |
| 7,246,184 B2* | 7/2007 | Griessbaum | 710/110 |
| 7,447,825 B2 | 11/2008 | Chen | |
| 7,877,521 B2* | 1/2011 | Suzuki et al. | 710/10 |
| 8,230,120 B2 | 7/2012 | Ajanovic et al. | |
| 8,312,298 B2 | 11/2012 | Peterson et al. | |
| 8,386,688 B2* | 2/2013 | Fullerton et al. | 710/308 |
| 2007/0233928 A1* | 10/2007 | Gough | 710/301 |
| 2008/0040526 A1* | 2/2008 | Suzuki et al. | 710/302 |

(Continued)

OTHER PUBLICATIONS

"The ExpressCard™ Standard—The Next Generation PC Card Technology," PCMCIA, Oct. 2003, retrieved from <http://www.usb.org/developers/expresscard/EC_whitepapers/ExpressCardWP.pdf> on Jan. 18, 2013; pp. 1-4.

(Continued)

*Primary Examiner* — Ryan Stiglic
(74) *Attorney, Agent, or Firm* — Meyertons Hood Kivlin Kowert & Goetzel, P.C.; Jeffrey C. Hood

(57) ABSTRACT

A system and method for reserving resources of a host computer for use by an external device configured to be coupled to an expansion bus of the host computer are described. The host computer may be configured to execute device resource software that operates at a startup of the host computer to reserve one or more resources for the external device. The external device may not be available during the startup of the host computer, e.g., because the external device is not powered on or is not physically connected to the host computer. The device resource software may subsequently detect that the external device becomes available after the startup of the host computer. In response, the device resource software may enable the external device to use the one or more resources that were previously reserved at the startup of the host computer.

12 Claims, 10 Drawing Sheets

(56) References Cited

U.S. PATENT DOCUMENTS

2009/0228611 A1* 9/2009 Ferguson et al. ................. 710/8
2011/0271028 A1* 11/2011 Fullerton et al. .............. 710/308
2012/0023277 A1* 1/2012 Graf et al. .................... 710/110
2013/0091316 A1* 4/2013 Fullerton et al. .............. 710/308

OTHER PUBLICATIONS

The ExpressCard Standard—The Next Generation PC Card Technology, PCMCIA, San Jose, CA, Oct. 2003, 4 pages.

* cited by examiner

RESOURCE RESERVATION FOR AN EXTERNAL DEVICE THAT IS NOT AVAILABLE AT STARTUP OF A HOST COMPUTER

FIELD OF THE INVENTION

The present invention relates to the field of computer systems, and more particularly to a system and method for reserving computer system resources during startup of a computer system for an external device that is not available (e.g., not powered on or not connected) when the computer system is started.

DESCRIPTION OF THE RELATED ART

Computers are used to interact with and control various kinds of measurement devices and instruments that interact with physical systems to implement many applications in the fields of test and measurement, process control, industrial automation, and simulation, among others. The use of computers to acquire measurements from and control instruments or measurement devices has become increasingly desirable in view of the increasing complexity and variety of instruments and devices available for use.

A measurement device or instrument is typically coupled to a host computer via a communication bus or expansion bus. Some measurement devices can be installed in an expansion bus slot within a housing of the host computer itself. For example, some host computers implement a PCI bus that has expansion slots inside the computer housing in which a measurement device can be installed in the form of an expansion card.

However, some measurement devices or instruments are too large to fit in a slot within the computer housing, or it may be necessary to attach more instruments than the number of slots available inside the computer housing. To overcome these problems, various standards have been developed for enabling a host computer to interact with external measurement devices or instruments that are located outside of the host computer itself. One example is the VXI (VME eXtensions for Instrumentation) system, which is a platform for instrumentation based upon the VMEbus. Another example is the PXI (PCI eXtensions for Instrumentation) Express system, which is a platform for instrumentation based upon the PCI Express bus. Both of these systems use an external chassis that connects to the host computer via a cable and contains slots into which various modules (instruments) can be added.

The measurement devices and instruments coupled to a host computer typically need to use various resources of the host computer to operate correctly. The host computer may implement a resource assignment procedure that operates at the startup of the host computer to determine which devices are currently connected to the host computer and to assign resources to these devices. In the case of an external device such as a VXI chassis or PXI Express chassis, the chassis may have its own power supply. Some prior art systems have required the external chassis to be powered on at the time when the host computer is powered on, or else the external chassis would not operate correctly. This can be problematic for some users who desire the ability to power the external chassis on and off independently from the host computer.

SUMMARY OF THE INVENTION

Various embodiments of a system and method for reserving resources of a host computer for use by an external device are described. The external device may not be available during a startup or boot process of the host computer, e.g., due to being powered off and/or physically disconnected from the host computer. According to one embodiment, the host computer may be configured to execute device resource software that operates at the startup of the host computer to reserve one or more resources for the external device. The device resource software may subsequently detect that the external device becomes available after the one or more resources have been reserved, e.g., due to a user powering on or connecting the external device to the host computer after the host computer's startup process has completed. In response, the device resource software may execute to enable the external device to use the one or more resources that were previously reserved at the startup of the host computer. This may enable the external device to operate correctly when powered on or connected after the host computer is started.

In some embodiments the external device may be an external chassis coupled to the host computer, or may be a device installed within the external chassis, such as a controller device for the chassis or a module installed in the chassis. In some embodiments the external chassis may have a separate power supply so that the chassis can be powered on and off separately from the host computer which has its own power supply.

In some embodiments the external device may share an expansion bus with one or more internal devices installed within the host computer (e.g., installed directly to an expansion bus slot within a housing of the host computer). For example, in some embodiments the host computer may implement a PCI Express bus, and the external device may be an external chassis (or controller device within the chassis) which physically resides externally to the host computer but logically resides on the PCI Express bus.

In various embodiments, various kinds of resources of the host computer may be reserved for the external device at the startup of the host computer. For example, in some embodiments the device resource software may reserve one or more bus numbers for use by the external device. In some embodiments the device resource software may also store memory or a particular memory address range for use by the external device, including prefetchable memory and/or non-prefetchable memory.

BRIEF DESCRIPTION OF THE DRAWINGS

A better understanding of the present invention can be obtained when the following detailed description of the preferred embodiment is considered in conjunction with the following drawings, in which:

FIG. 6 is a flowchart diagram illustrating one embodiment of a method in which the user powers the external device off and then back on again while the host computer is powered on;

Figure 1A:
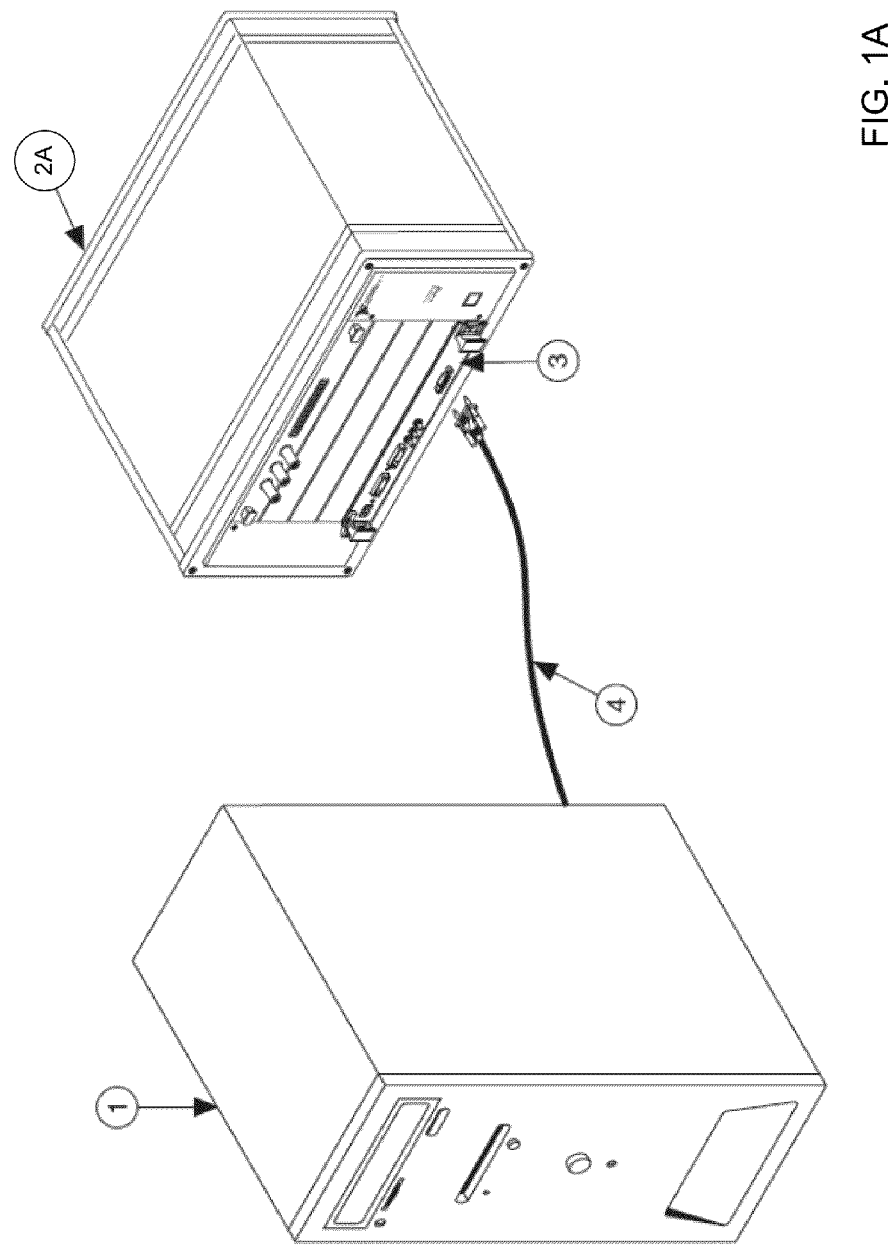
FIG. 1A illustrates an example of a host computer to which an external chassis is coupled.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Various embodiments of a system and method for reserving resources during the startup of a host computer for an external device that is not available during the startup process are described herein. The external device may not be available during the startup of the host computer for various reasons. In some embodiments the external device may not be available because the external device is not powered on during the startup. For example, in some embodiments the external device may have its own power supply enabling the external device to be powered on and off separately from the host computer which has a different power supply, and the power supply of the external device may not be turned on. In other embodiments the external device may share the host computer's power supply (e.g., may be bus-powered), but a cable that supplies the power from the host computer may not be connected to the external device at the startup of the host computer. In other embodiments the external device may be powered on at the startup of the host computer, but the external device may not be available to the host computer because it is not physically connected to the host computer. For example, the external device may need to be connected to the host computer by a cable, and the cable may not be plugged in, or the external device itself may not be physically present, e.g., due to having been temporarily moved by a user to a different location.

The external device may be configured to be coupled to an expansion bus of the host computer. As used herein, the term "bus" refers to a set of physical and logical connections that enable a host computer to communicate with a set of peripheral devices, and the term "expansion bus" refers to a bus with the following properties: (1) The peripheral devices connected to the bus can communicate with the CPU(s) of the host computer without requiring messages to be relayed through a controller; and (2) The bus requires particular resources (e.g., particular bus numbers or particular ranges of memory addresses) to be assigned to particular peripheral devices, and restricts or disallows the resources from being arbitrarily re-assigned or re-distributed after the host computer startup process has completed. Also, an expansion bus may optionally use one or more physical expansion slots or ports located internally within a chassis of the host computer, in which peripheral devices can be physically installed. Examples of expansion bus types having the above properties include PCI (Peripheral Component Interconnect) and PCI Express (Peripheral Component Interconnect Express).

During the startup process (boot process) of a host computer configured with conventional software, the operating system and BIOS perform a resource assignment process to determine which devices are available on the expansion bus, determine the resource requirements of the available devices, and assign particular resources to the available devices. The inability to arbitrarily re-assign or re-distribute the resources after the host computer startup process has completed (property (2) mentioned above) may be due to limitations imposed by the system software, the expansion bus architecture, or other factors. As a consequence of these limitations, adding a device to an expansion bus such as a PCI bus or PCI Express bus after the host computer startup process has completed is problematic. For example, if a device that was not connected to the expansion bus when the host computer is started later becomes connected, the new device may need to use a particular range of memory addresses in order to operate correctly. However, because the device was unavailable at the host computer startup, the operating system may have assigned that particular range of memory addresses to another device during the startup process. Since the memory address ranges and other resources assigned to the devices on the expansion bus cannot be arbitrarily re-assigned after the startup process has completed, the new device may not be able to operate correctly.

The system and method described herein may employ novel device resource software which executes during the startup process to reserve particular resources for a device that is configured to be coupled to the expansion bus, but is not actually powered on and physically connected to the host computer when the host computer is started up. Reserving the resources for the device may prevent particular resources needed by the device (e.g., particular bus numbers and/or particular ranges of memory addresses) from being assigned to other devices. When the device subsequently becomes available (powered on and connected), the resources that were previously reserved at the startup of the host computer may be assigned to and used by the device. This may enable the device to be powered on or connected after the startup of the host computer and function correctly.

It is noted that certain communication buses known in the art provide the ability to connect or power on devices after the startup of the host computer. For example, Universal Serial Bus (USB) devices can be connected after the startup of the host computer and still operate correctly. However, the Universal Serial Bus (and some other buses that provide similar abilities) is not an "expansion bus" as defined herein. For example, the Universal Serial Bus does not meet property (1) above because USB devices do not communicate with the CPU of the host computer without requiring messages to be relayed through a controller. In a conventional system, an expansion bus such as a PCI or PCI Express bus may not provide the ability for arbitrary devices to function correctly if connected or powered on after the startup process of the host computer has completed.

As noted above, an expansion bus may use one or more physical expansion slots or ports located internally within a chassis of the host computer. In some embodiments, the device for which the resources are reserved at the startup of the host computer may not be an internal device that is installed in one of these internal expansion bus slots or ports, but instead may be an external device that is physically located outside a chassis or housing of the host computer. However, the external device may still logically reside on the expansion bus. For example, an interface card for the external device may be installed in one of the internal expansion bus slots inside the host computer housing, and the interface card may implement a bridge that effectively extends the expansion bus outside of the host computer itself and enables the external device to join the expansion bus so that it appears to the host computer to be on the expansion bus similar to the internal devices that are installed in the internal expansion slots.

In some embodiments the external device may be an external chassis coupled to the host computer, or may be a device installed within the external chassis. For example, in some embodiments the external device may be an external chassis (or chassis controller device) that physically resides externally to the host computer but logically resides on a PCI Express bus implemented by the host computer.

In some embodiments the external chassis may have a separate power supply so that the chassis can be powered on and off separately from the host computer which has its own power supply. In other embodiments the external chassis may be powered by the host computer itself, e.g., via a power cable connecting the external chassis to the host computer.

In various embodiments the external device for which the resources are reserved during the host computer startup process may be various kinds of external chassis or chassis controllers, such as a VXI or PXI Express chassis or chassis controller, among others. FIG. 1A illustrates an example of a host computer 1 to which an external VXI chassis 2A is coupled. The rear of the VXI chassis 2A includes a port 3 to which the VXI chassis 2A couples to the host computer via a cable 4.

Figure 1B:
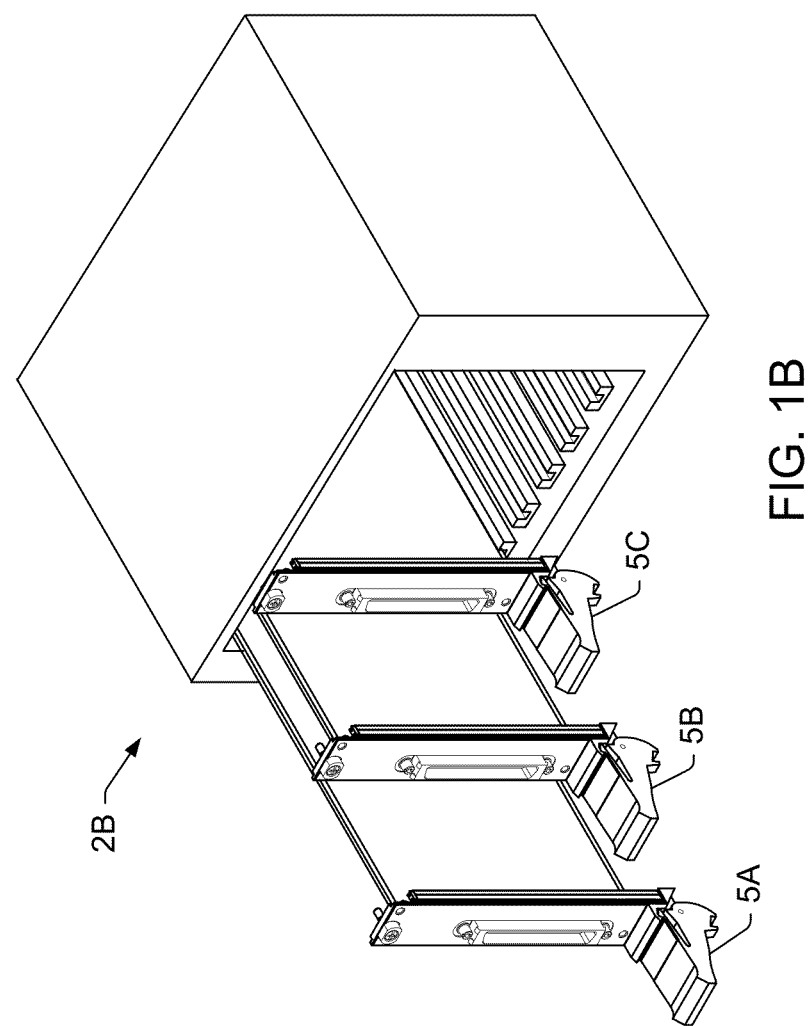
FIG. 1B illustrates the front of the external chassis.

FIG. 1B illustrates the front of a PXI chassis 2B. As shown, the PXI chassis 2B includes a plurality of slots in which measurement devices or other instrumentation modules (e.g., modules 5A, 5B, 5C, etc.) can be installed. Modules may be installed in the VXI chassis 2A in a similar manner.

In other embodiments the external device for which the resources are reserved during the host computer startup process may be a standalone device other than a chassis or a device installed within a chassis. In general, the external device may be any kind of device designed to perform any kind of function. In some embodiments the external device may be a measurement device, e.g., may be used to implement a test and measurement, process control, or industrial automation application. In other embodiments the external device may be a device involved in performing other types of applications, such as networking, gaming, imaging, etc.

Figure 2:
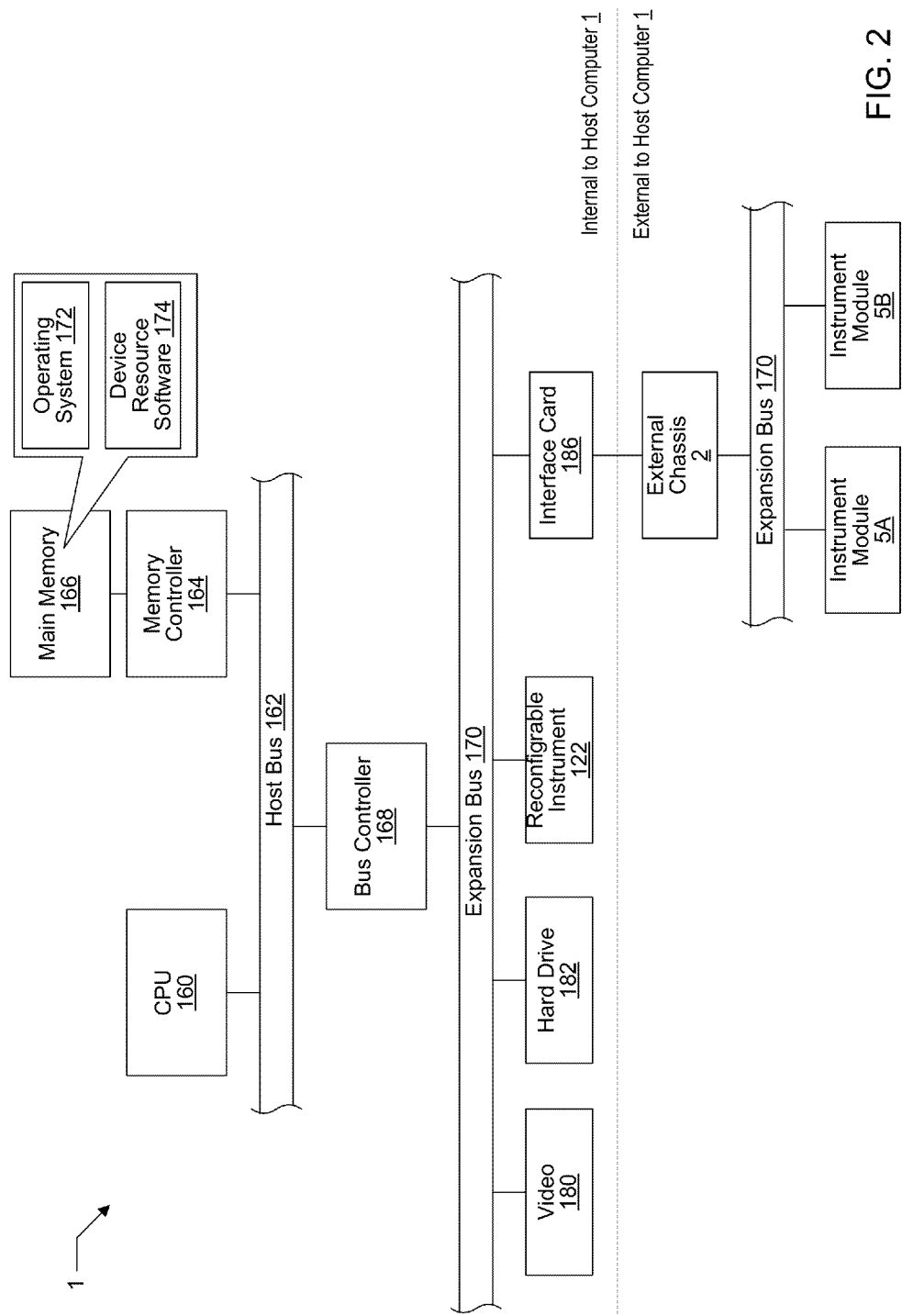
FIG. 2 is a block diagram representing one embodiment of the host computer.

FIG. 2 is a block diagram representing one embodiment of the host computer system 1 illustrated in FIG. 1A. It is noted that any type of computer system configuration or architecture can be used as desired, and FIG. 1A illustrates a representative PC embodiment. It is also noted that the host computer system may be a general-purpose computer system, a computer implemented on a card installed in a chassis, or other types of embodiments. Elements of a computer not necessary to understand the present description have been omitted for simplicity.

The host computer 1 may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store operating system software 172 as well as device resource software 174 that operates in conjunction with the operating system software 172 to reserve and assign host computer resources for the external device as described herein. In some embodiments the device resource software 174 may include a plurality of software programs, modules, or drivers that operate in conjunction with each other to implement the functionality described herein. An example of a particular architecture of the device resource software 174 is described below with reference to FIGS. 7 and 8.

The host bus 162 may be coupled to an expansion bus 170 by means of a bus controller 168 or bus bridge logic. In some embodiments the expansion bus 170 may be a PCI (Peripheral Component Interconnect) or PCI Express expansion bus, although other expansion bus types can be used. The expansion bus 170 includes slots for various devices, e.g., devices installed within the housing of the host computer 1. In the example of FIG. 2, various devices are installed in slots of the expansion bus 170, such as a video display subsystem 180, hard drive 182, and a reconfigurable instrument 122. The reconfigurable instrument 122 may include a programmable hardware element, such as an FPGA which enables the reconfigurable instrument 122 to be reconfigured to perform various functions.

In the illustrated embodiment, an interface card 186 for communicating with an external chassis 2 (e.g., such as the chassis 2A or 2B shown in FIGS. 1A and 1B) is also installed in one of the expansion bus 170 slots. The interface card 186 may be installed and located internally in the host computer 1 (e.g., within a housing or chassis of the host computer 1), while the external chassis 2 is located externally to the host computer 1. One end of a cable 4 may connect to the interface card 186, and the other end may connect to a port 3 of the external chassis 2.

The external chassis 2 may couple to the host computer 1 via the expansion bus 170. For example, the interface card 186 may effectively extend the expansion bus 170 outside of the host computer 1 along the cable 4 and enable the external chassis 2 (or chassis controller) to join the expansion bus 170 so that it appears to the host computer 1 as a device on the expansion bus 170, similar to the devices installed in the internal expansion slots. In some embodiments the external chassis 2 may further extend the expansion bus 170. For example, one or more modules such as the instrument modules 5A and 5B may be installed in slots of the external chassis 2 and may appear as additional devices on the expansion bus 170.

The ability to power on or connect the external chassis or other external device after the startup of the host computer and have it operate correctly is referred to herein as "variable power-on", since the user can power on the host computer and the external device in any order desired. In some embodiments the device resource software 174 may allow the user to enable or disable the variable power-on feature. The device resource software may only reserve resources for an unavailable external device at the startup of the host computer if the variable power-on feature has already been enabled for the external device.

Figure 3:
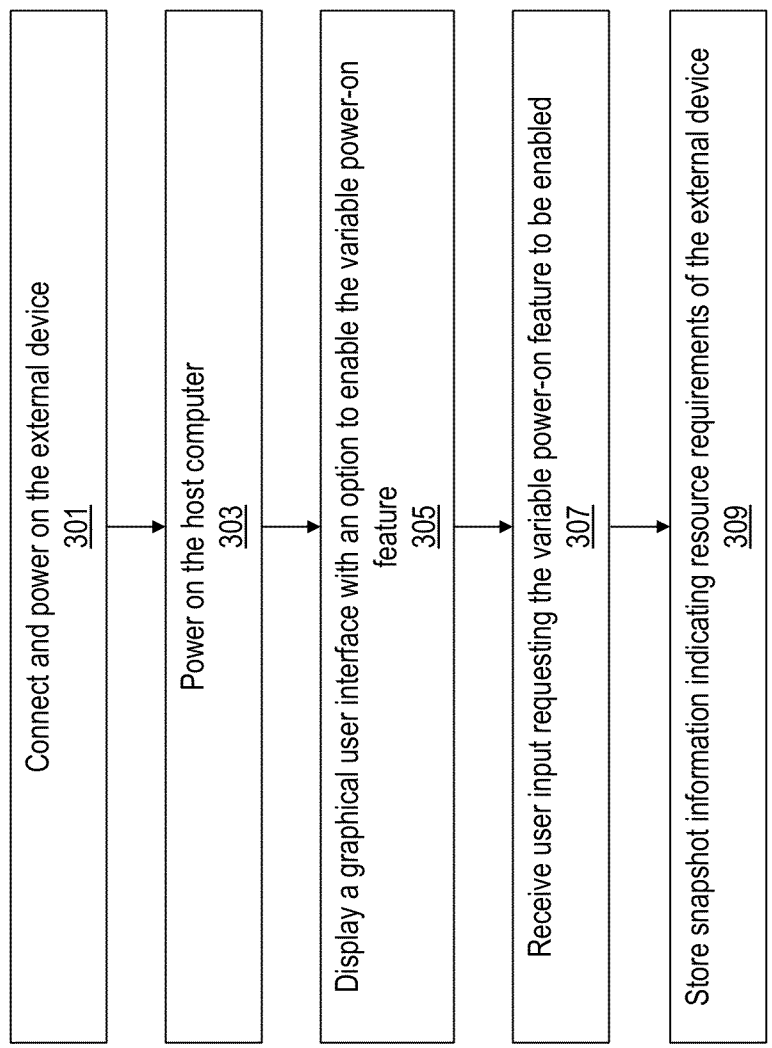
FIG. 3 is a flowchart diagram illustrating one embodiment of a method for enabling a variable power-on feature.

FIG. 3 is a flowchart diagram illustrating one embodiment of a method for enabling the variable power-on feature. Before the variable power-on feature is enabled, the external device may need to be already connected to the host computer and powered on (block 301) when the host computer is powered on (block 303). Powering on the external device before the host computer is powered on may enable the presence of the device to be detected during the startup of the host computer so that the operating system and device resource software can assign resources to the external device in the conventional manner.

Figure 4:
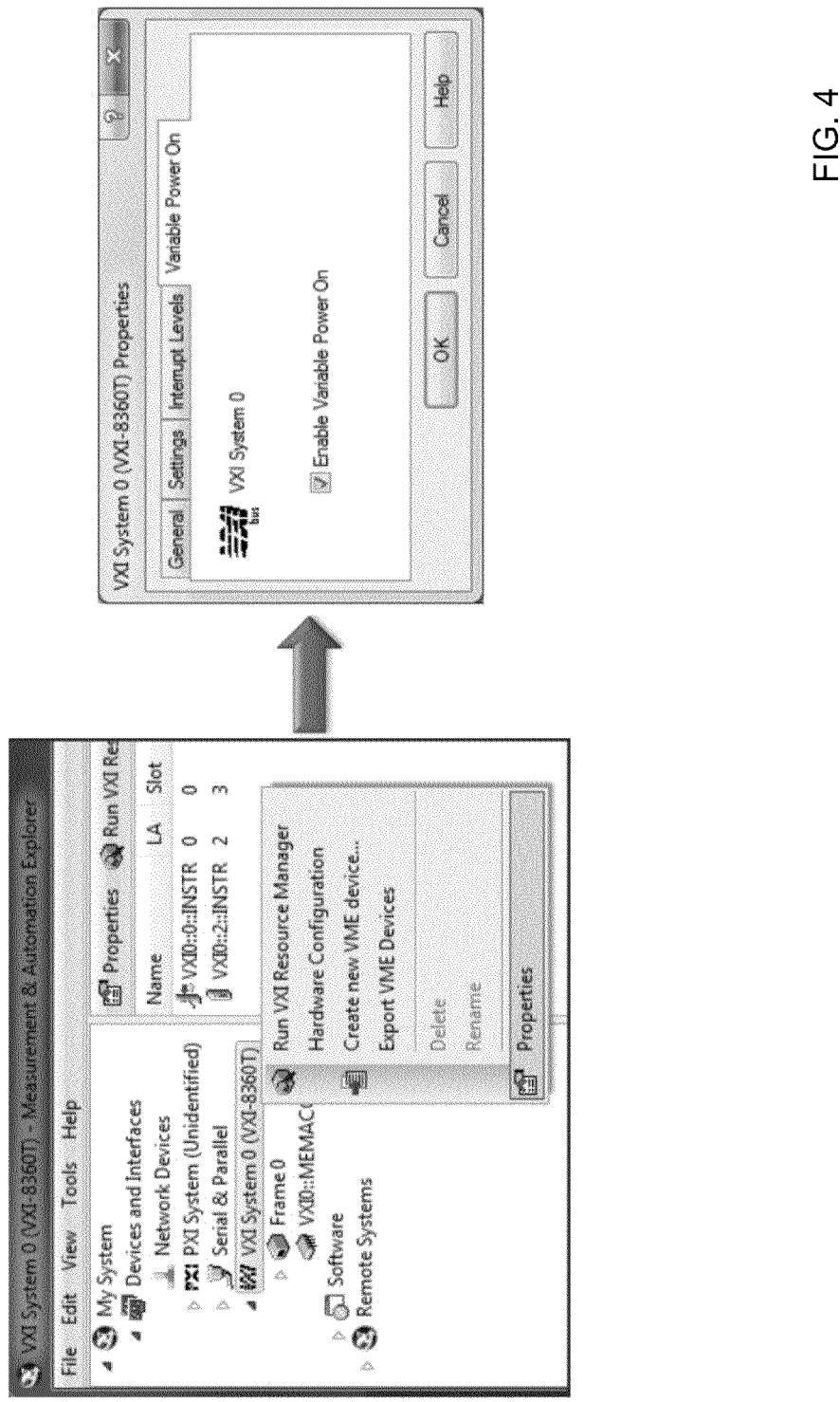
FIG. 4 illustrates an example of a graphical user interface for enabling the variable power-on feature.

After the host computer has started up, the device resource software may display a graphical user interface with an option to enable the variable power-on feature (block 305). User input requesting the variable power-on feature to be enabled may then be received via the graphical user interface (block 307). FIG. 4 illustrates an example of a graphical user interface for enabling the variable power-on feature. In this example, the graphical user interface is part of the Measurement & Automation Explorer software provided by National Instruments Corp., and the external device is an external VXI controller chassis. As shown on the left side of FIG. 4, the user may select a "Properties" menu for the VXI chassis to cause the VXI System Properties window shown on the right side of FIG. 4 to appear. The user may then select the "Variable Power On" tab at the top of this window and check the "Enable Variable Power On" checkbox to request the variable power-on feature to be enabled.

In response to the user input requesting the variable power-on feature to be enabled, the device resource software may store snapshot information indicating the resource requirements of the external device (block 309). For example, the device resource software may check to see which resources are currently assigned to the external device, and may store snapshot information indicating the currently assigned resources. As described below, if the host computer is subsequently re-started and the external device is unavailable during the startup process, the device resource software may access the stored snapshot information to determine which resources are needed by the external device and request the operating system to reserve those resources so that they can later be assigned to and used by the external device if it subsequently becomes available (powered on and connected).

In various embodiments, storing the snapshot information may include storing information regarding various kinds of resources needed by the external device, e.g., depending on which resources were assigned to the external device during the conventional resource assignment process that was conducted at the startup of the host computer. For example, if one or more particular bus numbers for the expansion bus were assigned to the external device then information specifying those particular bus numbers may be stored so that the same bus numbers can later be reserved for the external device if the host computer is re-started and the external device is unavailable. As another example, if one or more particular memory address ranges were assigned to the external device then information specifying those particular memory address ranges may be stored so that the same memory address ranges can later be reserved for the external device if the host computer is re-started and the external device is unavailable.

In various embodiments the snapshot information may be stored in various ways or in various locations, such as in one or more files or databases stored on a disk drive or other storage medium of the host computer. In some embodiments the snapshot information may be stored in a registry provided by the operating system.

Figure 5:
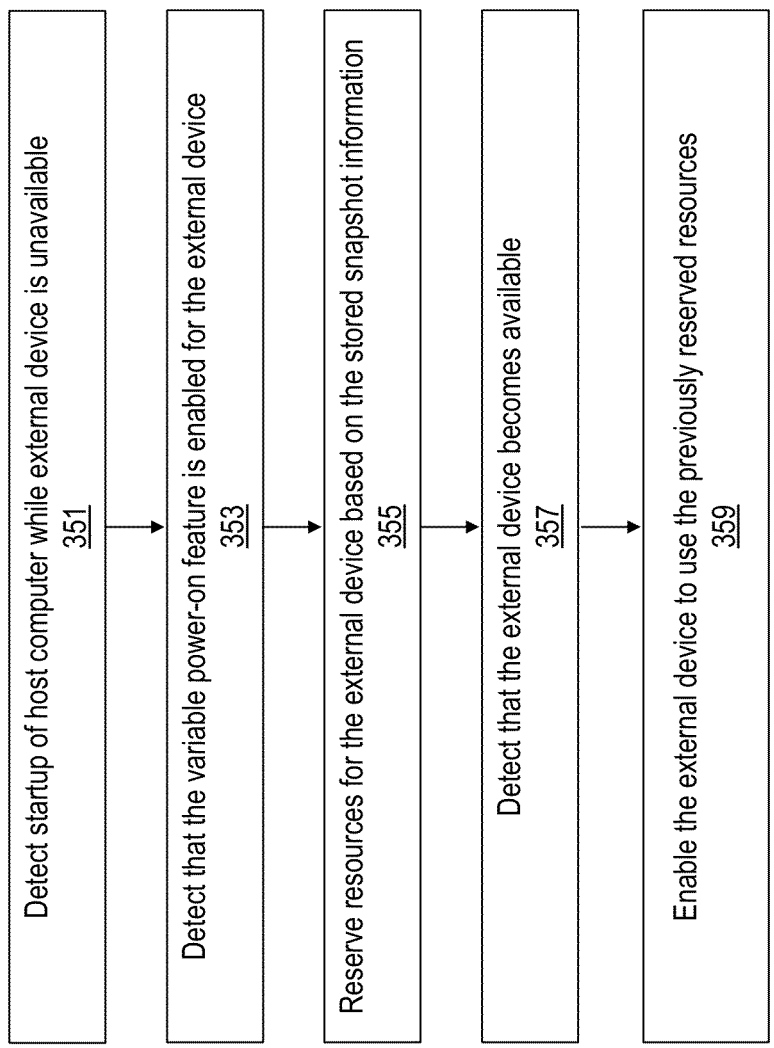
FIG. 5 is a flowchart diagram illustrating one embodiment of a method for re-starting the host computer after the variable power-on feature has been enabled.

After the variable power-on feature has been enabled and the snapshot information has been stored, the host computer can be re-started while the external device is unavailable, as shown in the flowchart of FIG. 5. As indicated in block 351, the device resource software may detect a startup of the host computer while the external device is unavailable, e.g., due to the external device being powered off and/or disconnected from the host computer. The device resource software may detect that the external device is unavailable, but that the variable power-on feature is enabled for the external device and that the snapshot information was previously stored for the external device (block 353). Since the variable power-on feature is enabled, this provides an indication that the user desires the ability to power on the external device after the host computer boots up, and thus, the device resource software may execute to reserve the necessary resources for the external device to prevent them from being assigned to other devices and to ensure that they are available in case the external device is subsequently powered on.

The device resource software may communicate with the operating system to reserve resources for the external device based on the stored snapshot information. In various embodiments, various kinds of resources of the host computer may be reserved for the external device. For example, if the snapshot information indicates that two particular bus numbers were assigned to the external device at the time when the snapshot information was created then the device resource software may reserve the same two bus numbers for the external device.

In some embodiments the device resource software may also reserve memory or a memory range for use by the external device. For example, in order to function correctly, the device may need to use a particular range of memory addresses, e.g., due to requirements imposed by the operating system or bus implementation. The device resource software may access the snapshot information to determine which particular range(s) of memory addresses are needed by the device and may reserve the required range(s) of memory addresses on behalf of the device so that these specific memory ranges will later be available for the device to use when it becomes connected to the expansion bus. Reserving a particular memory range for the device may prevent the memory range from being assigned to another device. The device resource software may reserve one or more ranges of prefetchable memory and/or non-prefetchable memory for the device.

The resource reservation described above may be performed by the device resource software which executes during the operating system's device resource assignment process during the startup of the host computer. After the startup process of the host computer has completed, the device resource software may subsequently detect that the external device becomes available (powered on and physically connected), e.g., by receiving an interrupt indicating this (block 357). The snapshot information may include identifier information for the external device so that the device resource software can match the snapshot information to the external device whose power-on was detected. In some embodiments, if the snapshot information does not match the external device (i.e., if the external device being powered on is not the same device for which the snapshot information was stored) then the device power-on may be ignored. Otherwise, if the snapshot information matches then the device resource software may communicate with the operating system to enable the external device to use the previously reserved resources (block 359) so that the external device can operate correctly.

The user can also disable the variable power-on feature after it has been enabled, e.g., using a graphical user interface such as shown in FIG. 4. If the user disables the variable power-on feature then the previously stored snapshot information may be deleted. In this case, the resource assignment may revert to the conventional manner such that resources will not be reserved for the external device if the external device is not powered on when the host computer is started. If the external device is later powered on, the device resource software may determine that required resources are not available to be assigned to the external device, and the external device may not function correctly.

In the description above, the resource reservation for the external device is performed based on previously stored snapshot information indicating the resource requirements for the external device. In other embodiments the resource reservation may be performed without necessarily requiring snapshot information to be stored to specify the resource requirements.

For example, in some embodiments resources may be reserved for an external device that is unavailable based on the presence of one or more other devices coupled to the host computer. The resources needed by present devices may reflect the needs of non-present (powered-off) devices. As one example, the host computer may be coupled to two external devices of the same type, where one of the external devices is powered on and the other is powered off during the startup of the host computer. Resources may be assigned to the first external device that is powered on in the conventional manner, and the device resource software may then reserve similar resources for the second external device based on the resources used by the first external device.

As another example, the device resource software may determine that the presence of one particular device during the startup of the host computer indicates a high likelihood that a second device will be added even if the second device is not yet powered or connected on during the startup of the host computer. In this case the device resource software may reserve resources for the second device so that they are available if the second device is later powered on during the operation of the host computer.

In other embodiments the device resource software may reserve the maximum amount of available resources for an external device, e.g., as opposed to reserving a more limited number of resources based on snapshot information indicating the resources that were previously assigned to the device. For example, the device resource software may reserve all the available bus numbers or memory for a powered-off external device.

Figure 6:
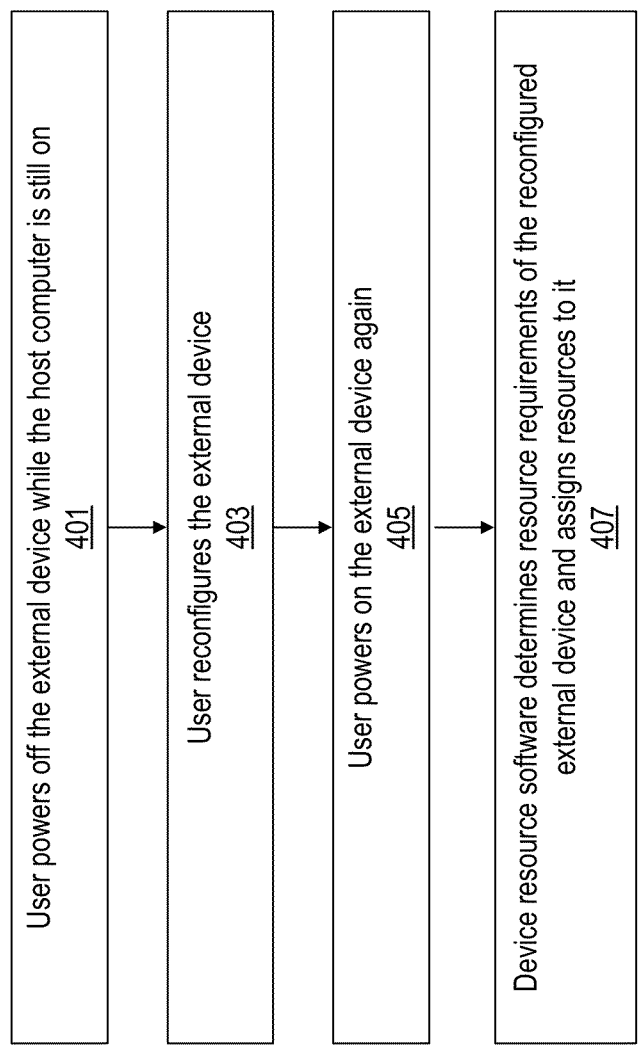

In addition to powering on the external device after the host computer is powered on, the user may also be able to power the external device off, reconfigure the external device, and then power the external device back on again while the host computer is powered on. For example, as shown in the flowchart of FIG. 6, the user may power off or disconnect the external device while the host computer is still on (block 401). The user may then reconfigure the external device (block 403). For example, if the external device is a chassis, such as a VXI or PXI Express chassis, then the user may replace a module or install a new module in the chassis. The user may then power on the external device again or re-connect it (block 405), and the device resource software may determine the resource requirements of the reconfigured external device and assign resources to it (block 407).

At least a subset of the resources that were previously assigned to the external device before it was powered off may be re-assigned to the reconfigured external device when it is powered on again. For example, if a particular bus number or memory address range was previously assigned to the device before it was powered off and the reconfigured external device requires the same bus number or memory address range then it may be re-assigned to the reconfigured external device.

In other embodiments, instead of reconfiguring the same external device and powering it on again, the user may power off the original external device and then connect and power on a new external device to replace it, e.g., where the new device is connected to the same port as the original external device. In this case the device resource software may determine the resource requirements of the new external device and assign resources to it, including at least a subset of the resources that were previously assigned to the original external device.

It is possible that the reconfigured external device or the new external device may require more resources than were previously assigned to the original external device before it was powered off, and one or more of the required resources may not be available, e.g., because they were assigned to other devices during the startup process of the host computer. In this case the reconfigured external device or new external device may not function correctly until the host computer is re-started.

The device for which the resources are reserved at the startup of the host computer is described above as an external device, but in some embodiments the device may be an internal device that is installed directly in one of the internal expansion bus slots located within the host computer. In this case the internal device will most likely be connected and powered on each time the host computer starts since it is installed in the internal expansion slot and draws its power from the slot, but the user may be able to disable the device during operation of the host computer, reconfigure or replace it, and then re-enable the reconfigured or replaced device similarly as described above with reference to FIG. 6.

In various embodiments the device resource software may be implemented in any of various ways. In some embodiments the device resource software may include a plurality of software programs, modules or drivers that operate in conjunction with each other. The various software components of the device resource software may be called by the operating system or by each other to help enumerating the devices connected to the host computer, determining resource requirements of the devices, and assigning resources to the devices.

Figure 7:
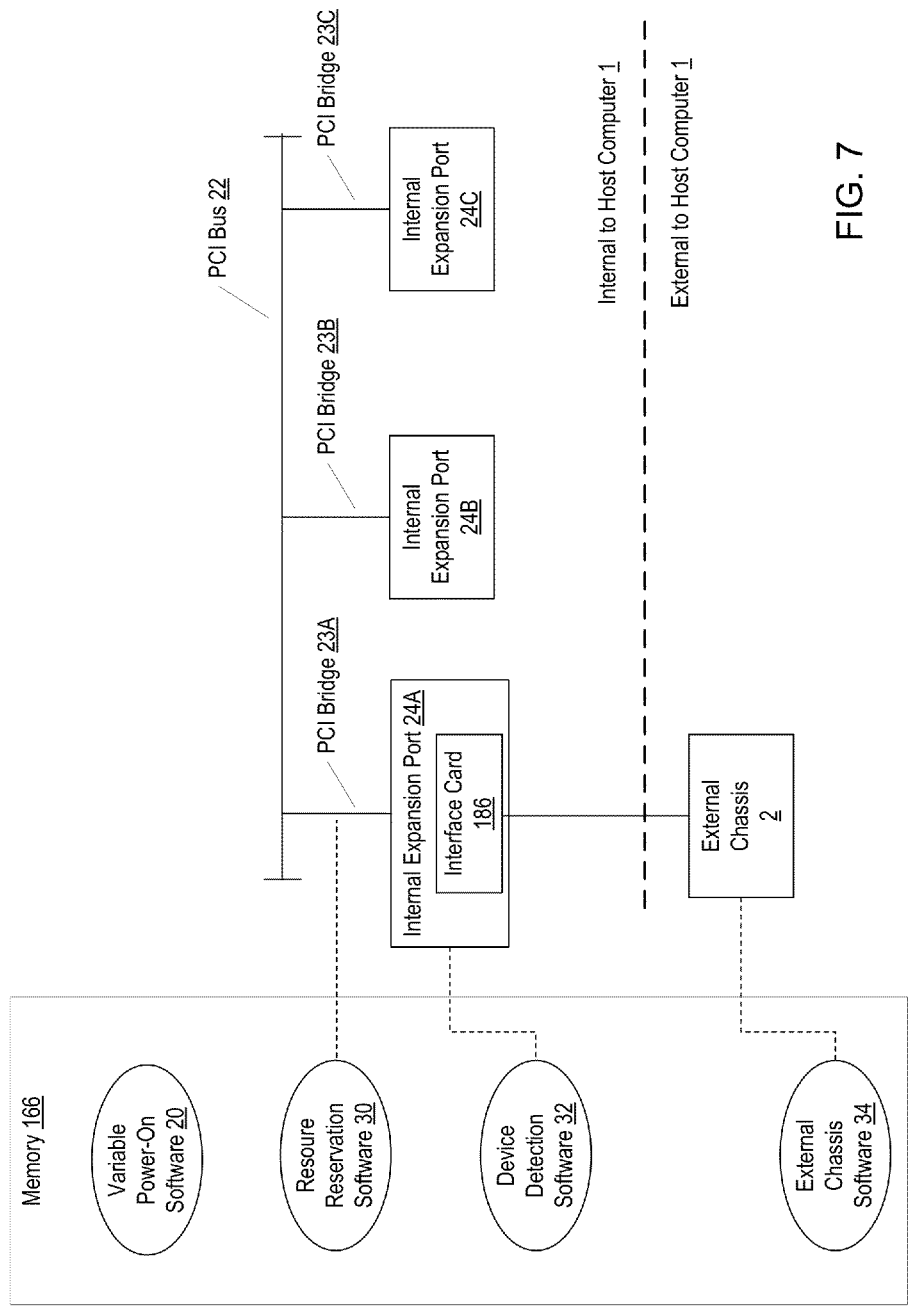
FIG. 7 illustrates various software components of device resource software, according to one embodiment.

FIG. 7 illustrates one particular embodiment of the device resource software, where the device resource software operates to reserve resource for an external chassis 2 which may not be available at the startup of the host computer. In this example, the device resource software may include various software modules stored in the memory 166 of the host computer, such as variable power-on software 20, resource reservation software 30, device detection software 32, and external chassis software 34.

Figure 8:
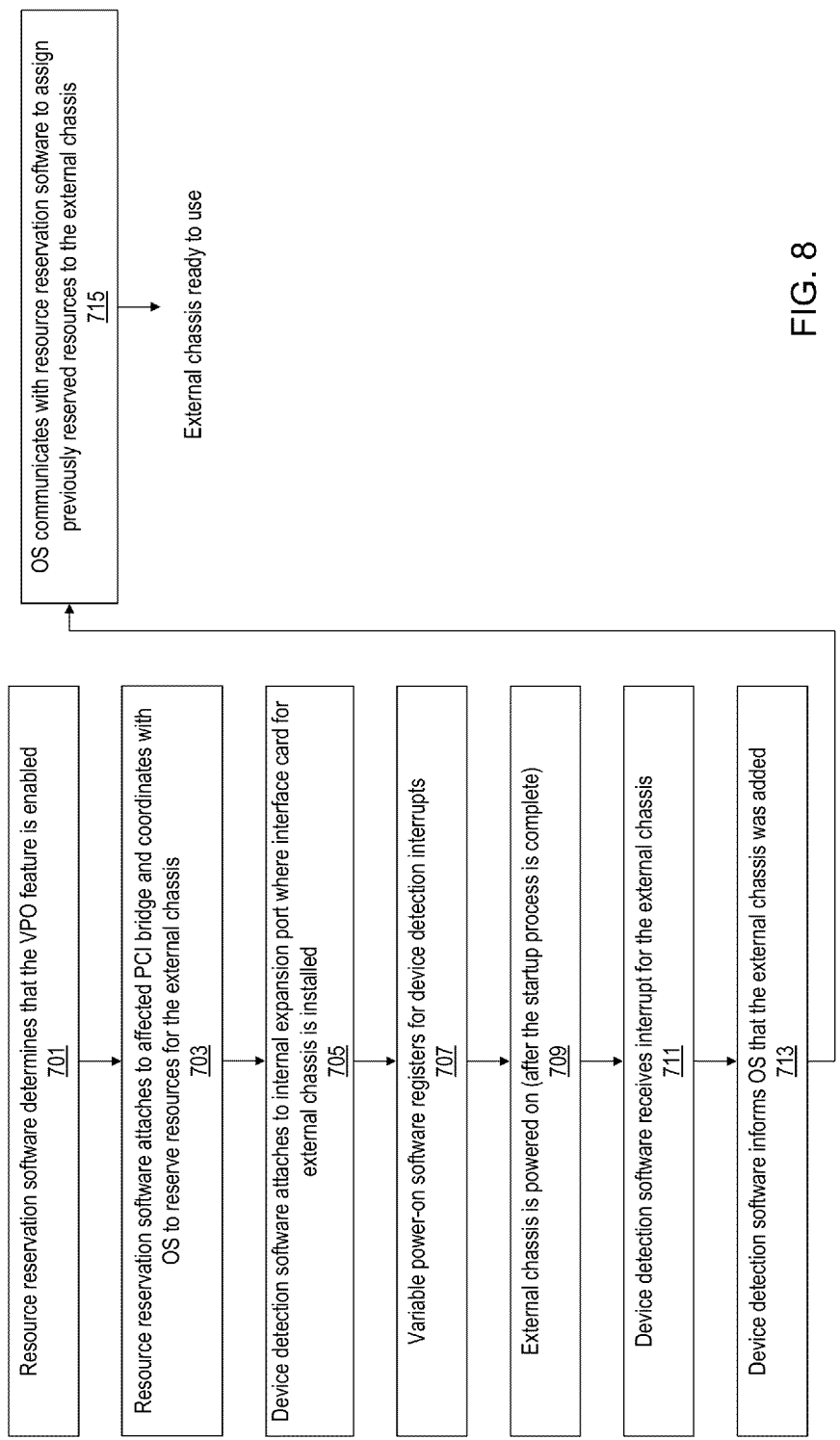
FIG. 8 is a flowchart diagram illustrating one embodiment of the operation of the software components illustrated in FIG. 7.

FIG. 8 is a flowchart diagram illustrating one embodiment of the operation of the software components illustrated in FIG. 7. The resource reservation software 30 may be activated at the startup of the host computer and may execute to determine that the variable power-on feature has been enabled for the external chassis 2 (block 701). The stored snapshot information for the external chassis 2 may indicate that the external chassis 2 couples to the host computer through the interface card 186 installed in the internal expansion port 24A which is coupled to the PCI bus 22 via the PCI bridge 23A. The resource reservation software 30 may communicate with the operating system to inform the operating system that it should be called to aid in determining the resource requirements for devices located on the PCI sub-tree extending from the PCI bridge 23A. Thus, the resource reservation software 30 effectively inserts itself into the resource assignment process performed by the operating system.

As part of the resource assignment process, the operating system may query the resource reservation software 30 to determine what resources are needed by the device(s) extending from the PCI bridge 23A. The resource reservation software 30 may access the stored snapshot information for the external chassis 2 to determine which particular bus numbers, memory address ranges, or other resources are needed by the external chassis 2 and may inform the operating system that these particular resources are needed so that these resources are reserved for the external chassis 2 and prevented from being assigned to another device (block 703).

Also during the startup of the host computer, the device detection software 32 may communicate with the operating system to attach itself as a driver or management component for the internal expansion port 24A where the interface card 186 for the external chassis 2 is installed (block 705). The variable power-on software 20 may register the device detection software 32 to receive device detection interrupts at the internal expansion port 24A (block 707).

The external chassis 2 may later be powered on by the user after the startup or boot process for the host computer has completed (block 709). This may result in the generation of an interrupt which is received by the device detection software 32 (block 711). In response to the interrupt, the device detection software 32 may inform the operating system that the external chassis 2 has been added to the system and that the operating should attempt to assign resources to the external chassis 2 so that it can function (block 713).

In response, the operating system may query the resource reservation software 30 to determine which resources to assign to the external chassis 2. The resource reservation software 30 may communicate with the operating system to assign the resources previously reserved in block 703 to the external chassis 2 to enable the external chassis 2 to use these resources so that it can function correctly on the PCI bus 22. Since the operating system was previously informed that these particular resources were needed, the resources should not have been assigned to another device, and thus should still be available and will have been unused until this point. Enabling the external chassis 2 to use the previously assigned resources may involve setting information fields in various data structures or registry entries to indicate that particular resources are now in use by the external chassis 2.

The external chassis software 34 may perform functions such as checking the serial number or identification information for the external device 2 and setting device name information that will be displayed to the user.

Figure 9:
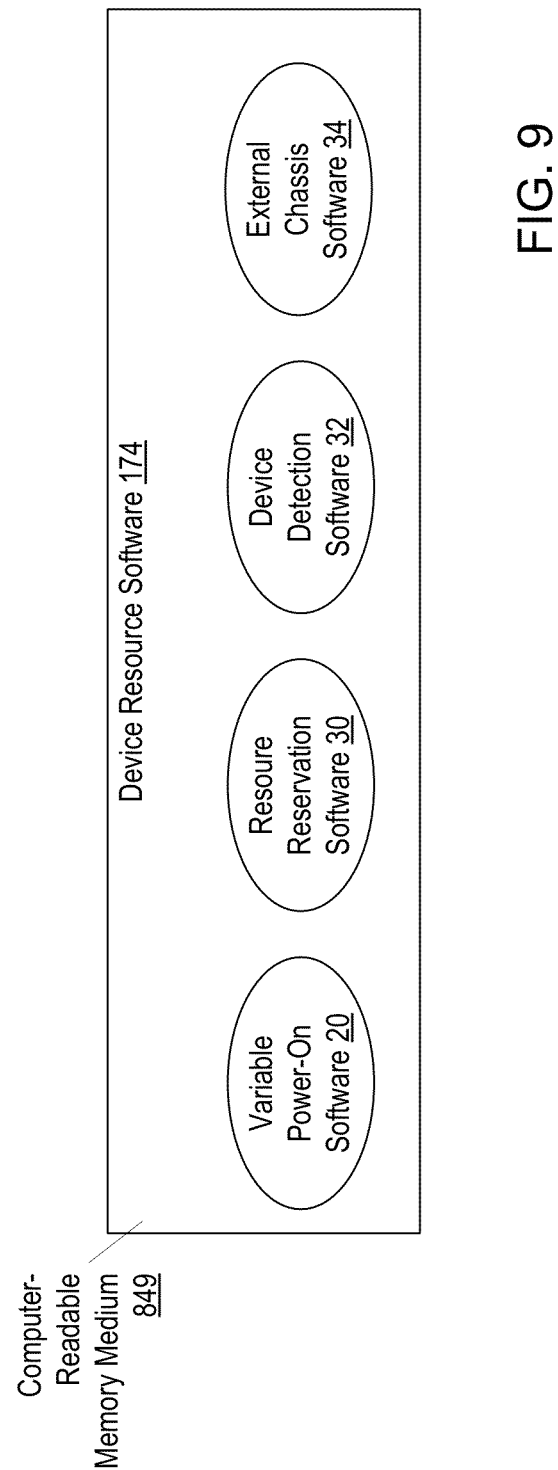
FIG. 9 is a block diagram illustrating a computer-readable memory medium.

Turning now to FIG. 9, a block diagram of a computer-readable memory medium 849 is shown. The computer-readable memory medium 849 may store program instructions executable by one or more processors to implement various functions described above, such as program instructions associated with the device resource software 174. As described above, in some embodiments the device resource software 174 may include variable power-on software 20, resource reservation software 30, device detection software 32, and external chassis software 34. Generally, the computer-readable memory medium 849 may store any set of instructions which, when executed, implement a portion or all of the functions described above.

Generally speaking, a computer-readable memory medium may include any storage media accessible by a computer during use to provide instructions and/or data to the computer. For example, a computer-readable memory medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-readable memory medium storing program instructions executable by a host computer to:
    prior to the startup of the host computer,
        store information indicating resource requirements of an external device, wherein the external device comprises one or more of:
            an external chassis having a plurality of slots for installing modules; or
            a controller device for the external chassis; and
        enable a variable power-on feature for the external device in response to user input requesting the variable power-on feature to be enabled;
    at a startup of the host computer,
        access the information to determine a plurality of resources to reserve for the external device, and
        reserve the plurality of resources for the external device based on said enabling, wherein the external device is not available at the startup of the host computer because the external device is not powered on during the startup of the host computer, and wherein the external device is configured to be coupled to an expansion bus of the host computer;
    detect that the external device becomes available subsequently to reserving the plurality of resources, wherein said detecting that the external device becomes available comprises detecting that the device becomes powered on; and
    enable the external device to use the plurality of resources that were previously reserved at the startup of the host computer, wherein enabling the device to use the plurality of resources configures the device to operate on the expansion bus.

2. The non-transitory computer-readable memory medium of claim 1,
    wherein the external device connects to the host computer by a cable.

3. The non-transitory computer-readable memory medium of claim 1,
    wherein the external device shares the expansion bus with one or more internal devices installed within the host computer.

4. The non-transitory computer-readable memory medium of claim 1,
    wherein reserving the plurality of resources includes reserving a plurality of bus numbers for use by the external device on the expansion bus.

5. The non-transitory computer-readable memory medium of claim 1,
    wherein reserving the plurality of resources includes reserving a plurality of ranges of memory addresses for use by the external device.

6. The non-transitory computer-readable memory medium of claim 1,
    wherein the expansion bus is one of:
        a Peripheral Component Interconnect (PCI) bus; or
        a Peripheral Component Interconnect Express (PCI Express) bus.

7. A system comprising:
    a host computer system including one or more processors and memory storing program instructions; and
    an external device, wherein the external device comprises one or more of:
        an external chassis having a plurality of slots for installing modules; or
        a controller device for the external chassis;
    wherein the program instructions are executable by the one or more processors of the host computer system to:
        prior to the startup of the host computer,
            store information indicating resource requirements of the external device; and
            enable a variable power-on feature for the external device in response to user input requesting the variable power-on feature to be enabled;
        at a startup of the host computer system,
            access the information to determine a plurality of resources to reserve for the external device, and reserve the plurality of resources for the external device in based on said enabling, wherein the external device is not available at the startup of the host computer system because the external device is not powered on during the startup of the host computer, and, wherein the external device is configured to be coupled to an expansion bus of the host computer system;

detect that the external device becomes available subsequently to reserving the plurality of resources, wherein said detecting that the external device becomes available comprises detecting that the device becomes powered on; and enable the external device to use the plurality of resources that were previously reserved at the startup of the host computer system, wherein enabling the device to use the plurality of resources configures the device to operate on the expansion bus.

8. The system of claim 7, wherein reserving the plurality of resources includes reserving a plurality of bus numbers for use by the external device on the expansion bus.

9. The system of claim 7, wherein reserving the plurality of resources includes reserving a plurality of ranges of memory addresses for use by the external device.

10. The system of claim 7, wherein the expansion bus is one of:
    a Peripheral Component Interconnect (PCI) bus; or
    a Peripheral Component Interconnect Express (PCI Express) bus.

11. A computer-implemented method comprising:

prior to the startup of the host computer,
    storing information indicating resource requirements of an external device, wherein the external device comprises one or more of:
        an external chassis having a plurality of slots for installing modules; or
        a controller device for the external chassis; and
    enabling a variable power-on feature for the external device in response to user input requesting the variable power-on feature to be enabled;

at a startup of a host computer,
    accessing the information to determine a plurality of resources to reserve for the external device, and
    reserving the plurality of resources for the external device based on said enabling, wherein the external device is not available at the startup of the host computer because the external device is not powered on during the startup of the host compute, and wherein the external device is configured to be coupled to an expansion bus of the host computer;

detecting that the external device becomes available subsequently to reserving the one or more resources; and enabling the external device to use the plurality of resources that were previously reserved at the startup of the host computer, wherein enabling the device to use the plurality of resources configures the device to operate on the expansion bus.

12. A method comprising:

a host computer assigning a plurality of resources to a device coupled to an expansion bus of the host computer, wherein the device comprises an external chassis located externally to the host computer, wherein the external chassis has a plurality of slots for installing modules;

the host computer storing information indicating the plurality of resources for the external device and enabling a variable power-on feature for the external device in response to user input requesting the variable power-on feature to be enabled;

powering off the device after assigning the plurality of resources;

re-configuring the device after powering off the device, wherein re-configuring the device comprises one or more of:
    replacing a module installed in the external chassis; or
    installing a new module in the external chassis;

powering on the device after re-configuring the device; and the host computer determining resource requirements of the re-configured device by accessing the information and assigning at least a subset of the previously assigned resources to the re-configured device based on said enabling.

* * * * *